United States Patent
Diggle, III et al.

(10) Patent No.: US 7,175,160 B2
(45) Date of Patent: Feb. 13, 2007

(54) RACEWAY LINE PULLER AND METHOD OF USING SAME

(75) Inventors: Frederick James Diggle, III, Birmingham, AL (US); Jacob P. Jackson, Cullman, AL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 97 days.

(21) Appl. No.: 10/777,404

(22) Filed: Feb. 12, 2004

(65) Prior Publication Data

US 2005/0179014 A1 Aug. 18, 2005

(51) Int. Cl.
*E21C 29/16* (2006.01)
(52) U.S. Cl. .......................... 254/134.3 FT
(58) Field of Classification Search .......... 24/16 PB; 254/134.3 FT
See application file for complete search history.

(56) References Cited

U.S. PATENT DOCUMENTS

| | | | |
|---|---|---|---|
| 1,689,170 A | 10/1928 | Farmer | |
| 3,330,533 A | 7/1967 | Blume | |
| 4,101,114 A * | 7/1978 | Martin et al. | 254/134.3 FT |
| 4,171,123 A * | 10/1979 | Woelkers | 254/134.3 FT |
| 5,517,785 A | 5/1996 | Sawaf | |
| 6,098,250 A * | 8/2000 | Katz | 24/16 PB |
| 6,193,217 B1 * | 2/2001 | Zimmer | 254/134.3 FT |

OTHER PUBLICATIONS

New Tech Industries, Inc., "Fish Tape and Push Pull Rods", webpages, May 17, 2004, http://www.newtechindustries.com/newtech/access/page38d.htm.
TW Acomm.com, "Greenlee 30596—Junior Basket Type Pulling Grip", webpages, May 17, 2004, http://www.twacomm.com/Catalog/Model_30596.htm?SID=NRGND... .
U.S. Appl. No. 10/777,413, filed Feb. 12, 2004.
U.S. Appl. No. 10/777,919, filed Feb. 12, 2004.

* cited by examiner

*Primary Examiner*—Robert C. Watson
(74) *Attorney, Agent, or Firm*—Lee & Hayes, PLLC

(57) ABSTRACT

An apparatus for pulling line through a raceway includes an attachment member and a body having a plurality of mounting apertures through the body. The attachment member is attached to an end of the body and adapted to releasably attach to an end of a fish tape. Further, the plurality of mounting apertures lies in a common plane.

20 Claims, 3 Drawing Sheets

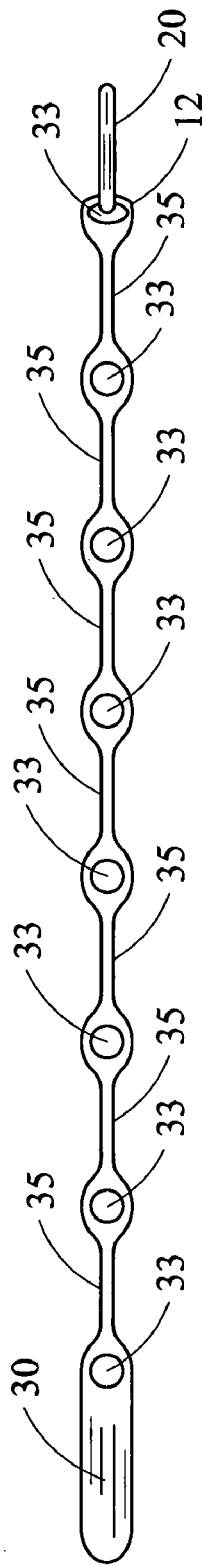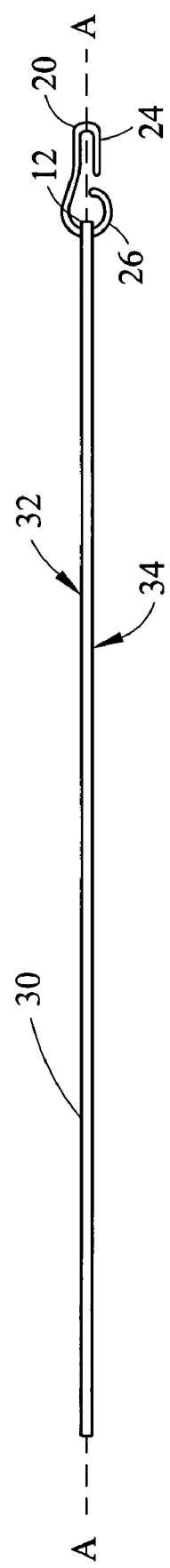

RACEWAY LINE PULLER AND METHOD OF USING SAME

BACKGROUND

The subject invention generally and in various embodiments relates to devices and methods for pulling one or more lines or wires, and more particularly to an apparatus and methods for pulling one or more lines or wires through raceways.

Electricians and/or technicians are often required to install a run of one or more lines or wires (e.g., electrical or communication wire) through lengths of raceways. Raceways may include conduits, ducts and other enclosed channels. A fish tape is commonly sent through the raceway for installing the run of lines or wires. Often, a first line or wire is folded about a tab at an end of the fish tape and taped to itself on the other side where it is doubled over. Then, if necessary, additional lines or wires are taped flush along the first line or wire. The fish tape is then pulled back out of the raceway with the lines or wires attached, with the intent to install the line or wire with the fish tape being removed. This places a tremendous amount of tension on the first line or wire where additional lines or wire are attached. Often the raceway will have angled bends (e.g., 90 degree bends, etc.) and may already have runs of line or wire inside the raceway. With this tension of the first line or wire carrying the additional lines or wires and the possible obstacles, the first line or wire may often pull away from the tab of the fish tape. Further, it is sometimes a challenge to circumvent the obstacles and deviations in the raceway without having lines or wires pull away from the first line or wire due to the lack of strength in the flush securing of the additional lines or wires to the first line or wire.

SUMMARY

Various embodiments of the present invention include an apparatus for pulling line through a raceway. The apparatus includes an attachment member and a body having a plurality of mounting apertures through the body. The attachment member is attached to an end of the body and is adapted to releasably attach to an end of a fish tape. Further, the plurality of mounting apertures lies in a common plane.

Various embodiments of the present invention also include a method for pulling line through a raceway. The method includes folding the line through a mounting aperture on a body and securing the line on both sides of the mounting aperture to the body. The method further includes attaching an attachment member connected to the body to an end of a fish tape and pulling the fish tape through the raceway.

Other systems, methods, and/or products according to embodiments will be or become apparent to one with skill in the art upon review of the following drawings and detailed description. It is intended that all such additional systems, methods, and/or products be included within this description, be within the scope of the present invention, and be protected by the accompanying claims.

BRIEF DESCRIPTION OF THE DRAWINGS

In the accompanying Figures, there are shown various embodiments of the present invention wherein like reference numerals are employed to designate like parts and wherein:

FIG. 1 is a top view of a line pulling apparatus according to various embodiments of the present invention;

FIG. 2 is a side view of the line pulling apparatus of FIG. 1;

DETAILED DESCRIPTION

Figure 3:
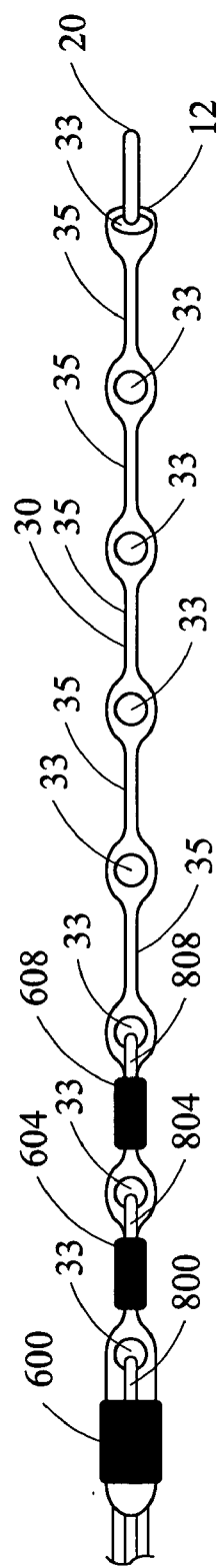
FIG. 3 illustrates the line pulling apparatus of FIG. 1 having lines attached.

Referring now to the drawings for the purpose of illustrating the invention and not for the purpose of limiting the same, it is to be understood that standard components or features that are within the purview of an artisan of ordinary skill and do not contribute to the understanding of the various embodiments of the invention are omitted from the drawings to enhance clarity. In addition, it will be appreciated that the characterizations of various components and orientations described herein as being "vertical" or "horizontal", "right" or "left", "side", "top", "bottom", "upper" or "lower" are relative characterizations only based upon the particular position or orientation of a given component for a particular application.

Figure 4:
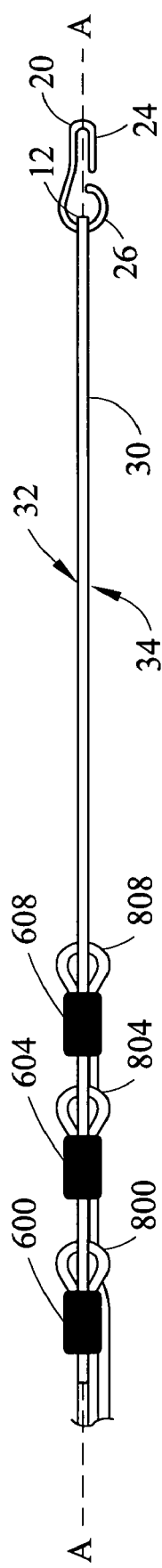
FIG. 4 is a side view of the line pulling apparatus of FIG. 3.
Figure 5:
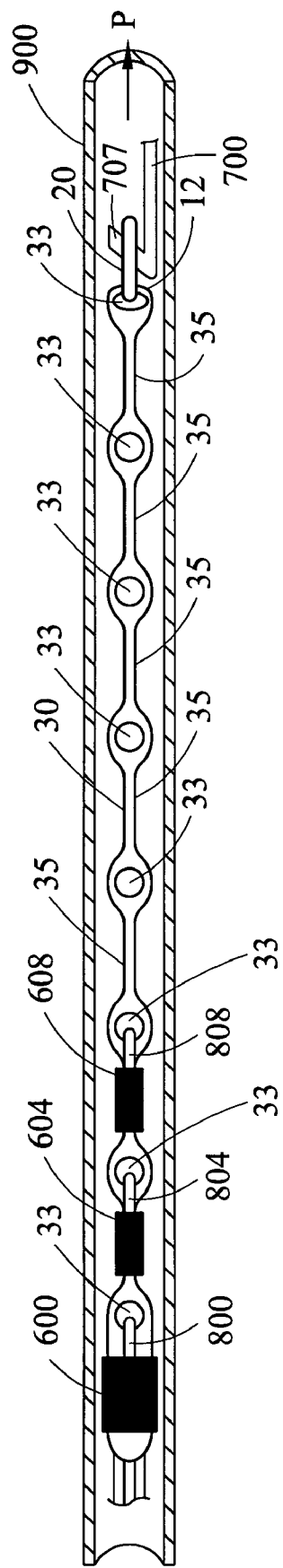
FIG. 5 is the line pulling apparatus of FIG. 3 in a raceway shown in cross-section.

FIGS. 1–5 depict various embodiments of a line puller 10 that generally can be employed by a user, such as a technician (not shown) for example. The line puller 10 can be used to pull a line 800 through a raceway 900. Alternatively, more than one line 800 can be pulled, as shown in FIG. 5. The raceway 900 may be, for example, a conduit, duct, enclosed channel, etc. The line puller 10 has an attachment member 20 attached to a body 30. The body 30 has mounting apertures 33 through the body 30. As can be seen in the drawings, the line 800 is releasably secured to one mounting aperture 33 being positioned through the mounting aperture 33 and secured by tape 600 to the body 30. In this embodiment, multiple mounting apertures 33 are provided through the body 30. The attachment member 20 is attached to an end 12 of the body 30 and is configured to fit within the raceway 900.

In various embodiments, the mounting apertures 33 in the body 30 lie in a common plane A—A. Such a configuration allows the mounting apertures 33 to secure the line 800 in a predictable position while the body 30 remains flexible to negotiate bends and other obstacles in the raceway 900. Further, in this embodiment, the body 30 has opposed planar surfaces 32, 34 parallel with the common plane A—A to provide predicable positioning of the line 800. These opposed planar surfaces 32, 34 also assist in allowing the body 30 to flex. Thus, the body 30 is able to negotiate a multitude of obstacles due to the flexibility of the body 30 while securing the line 800, or multiple lines 800, 804, 806, in a desired position on the body 30.

The mounting apertures 33 have inner dimensions sized to receive the line 800. This allows the line 800 to be releasably secured to one mounting aperture 33. In addition, the mounting apertures 33 have convex circumferential edges about the openings of each mounting aperture 33. These rounded openings prevent chafing of the line 800, for example, and other deleterious consequences of having perpendicular circumferential corners for openings in each mounting aperture 33. Thus, the line 800 is releasably secured to the body 30 while minimizing the possibility for damage to the line 800.

The line 800 may be releasably secured to one mounting aperture 33 by folding the line 800 through one mounting aperture 33 and then securing the line 800 on both sides of the mounting aperture 33 to the body 30 with tape 600, as shown in FIGS. 3–5. In addition, the body 30 has dimensions that allow the body 30 to fit within the raceway 900. This is due to the body 30 having a width, or diameter, that is capable of being positioned within the raceway 900.

As illustrated, the attachment member 20 is a hook 24. The hook 24 has a loop 26 that is attached to one mounting aperture 33 at the end 12 of the body 30. The hook 24 and loop 26 are constructed to fit within the raceway 900, as depicted in FIG. 5. The attachment member 20 can be releasably attached to an end 707 of a fish tape 700. See FIG. 5. Thus, the attachment member 20 is adapted to releasably attach to the end 707 of the fish tape 700 for pulling the line 800 through the raceway 900.

In various embodiments, the line 800 is releasably secured to one mounting aperture 33. The line 800 is positioned through the mounting aperture 33 and releasably secured to the body 30 on each side of the mounting aperture 33 for pulling through the raceway 900. See FIGS. 3–5. As shown, the line 800 is releasably secured to one mounting aperture 30 by tape 600. However, other ways of releasably securing the line 800 may be used such as, for example, rubber bands, clips, etc. Further, although the line puller 10 has one attachment member 20, different attachment members may be attached to the end 12 of the line puller 10. Alternatively, more than one mounting aperture 30 can have one line 800 releasably secured to that mounting aperture 33 as illustrated in FIGS. 3–5. As shown, lines 804, 808 are respectively secured by tape 604, 608 to the body 30 through separate mounting apertures 33.

As shown, the body 30 allows the weight of each line 800 attached to the line puller 10 to be transferred directly to the fish tape 700. Thus, no one line 800 is additionally burdened with additional weight from additional lines 800 being attached. See FIGS. 3–5. As such, the body 30 may thus be constructed from different materials having a sufficient tensile strength to carry multiple lines 800 such as, for example, metals, polymeric materials, etc. Thus, the line puller 10 generally is formed such that the line puller 30 is capable of carrying multiple lines 800.

The configuration of the attachment member 20 provides for attachment to the end 12 of the body 30 through one mounting aperture 33. This allows the body 30 to be securely fastened to the attachment member 20 as the line puller 10 is employed. See FIG. 5. However, the attachment member 20 may also be releasably attached to the end 12 of the body 30. Such a releasable attachment may be accomplished by using, for example, a gap in the loop, a scissor hook, a releasable clasp, etc.

FIGS. 3–5 illustrate the line puller 10 having multiple lines 800, 804, 806 attached. More lines (not shown) can be attached to the unoccupied mounting apertures 33 until the bundle of lines is too great to fit within the raceway 900. The lines 800, 804, 808 are secured to the body 30 by tape 600, 604, 608, respectively. Several portions of the tape 600, 604 may be additionally used to further secure lines 804, 808 to the body 30 by wrapping around those lines 804, 808 as well.

In various embodiments, the line puller 10 has complementary recesses 35 positioned on each side of the body 30. The recesses 35 are positioned between the mounting apertures 33 along the length of the body 30. Further, the recesses 35 provide the body 30 with an undulated appearance. However, the recesses 35 may alternatively have a crenellated appearance or other appearance that suits the application of the line puller 10. The recesses 35 provide an area in which tape 600 can be applied around both sides of the line 800 folded through the mounting aperture 33. Thus, the line 800 is secured on both sides of the mounting aperture 33 to the body 30 about one complementary recess 35. As discussed above, the tape 600, 604 may additionally wrap around other lines 804, 808 to further secure the lines 804, 808 to the body 30 within recesses 35.

FIG. 5 illustrates the line puller 10 in the raceway 900 as it is pulled in the direction P. As shown, the line puller 10 has the lines 800, 804, 808 releasably attached through mounting apertures 33 to the body 30. The lines 800, 804, 808 are releasably attached to the line puller 10 by folding the lines 800, 804, 808 through one of the mounting apertures 33. Then the lines 800, 804, 808 can be secured to the body 30 on both sides of the respective mounting aperture 33 by tape 600, 604, 608, as illustrated. Further, lines 804, 808 may additionally be secured by tape 600, 604 to recesses 35. The line puller 10 is releasably attached to the end 707 of the fish tape 700 so that the line puller 10 can pull the lines 800, 804, 808 in the direction P.

As shown in the drawings, the line puller 10 has been depicted as having generally circular mounting apertures 33. As well, in one embodiment the raceway 900 is cylindrical. The mounting apertures 33 may be configured in a variety of shapes such that the line puller 10 is capable of attaching to the configuration of the line 800. Further, the line puller 10 may be configured to permit it to pass through the raceway 900 for which the line puller 10 is shaped to fit within. Other shapes and configurations of raceways (not shown) may include, but are not limited to ducts, enclosed channels, etc.

Whereas particular embodiments of the invention have been described herein for the purpose of illustrating the invention and not for the purpose of limiting the same, it will be appreciated by those of ordinary skill in the art that numerous variations of the details, materials, configurations and arrangement of parts may be made within the principle and scope of the invention without departing from the spirit of the invention. The preceding description, therefore, is not meant to limit the scope of the invention.

What is claimed is:

1. An apparatus comprising:
   a body constructed of metal, and having a plurality of mounting apertures therethrough lying in a common plane, and a plurality of elongated recesses, one of the elongated recesses being positioned between each two consecutive mounting apertures along the length of the body;
   an attachment member attached to an end of the body, and adapted to releasably attach to an end of a fish tape; and
   at least two lines, each line being attached to a different one of the mounting apertures.

2. The apparatus of claim 1, wherein the attachment member releasably attaches to the end of the body.

3. The apparatus of claim 1, wherein the recesses comprise complementary recesses between the plurality of mounting apertures along the length of the body to provide areas for securing the line to the body.

4. The apparatus of claim 1, wherein the plurality of mounting apertures has rounded convex circumferential edges about the openings of the plurality of mounting apertures.

5. The apparatus of claim 1, wherein the body is flexible.

6. The apparatus of claim 1, wherein the attachment member comprises a hook having a loop attached to the end of the body.

7. The apparatus of claim 1, wherein the body has opposed planar surfaces parallel with the common plane.

8. The apparatus of claim 1, wherein at least one mounting aperture of the plurality of mounting apertures is configured to have line positioned therethrough and releasably secured thereto.

9. The apparatus of claim 8, wherein line can be releasably secured to the at least one mounting aperture with tape.

10. The apparatus of claim 1, wherein the plurality of mounting apertures has an inner dimension sized to receive the line.

11. The apparatus of claim 10, wherein the body is sized to fit within the raceway.

12. The apparatus to claim 11, wherein the attachment member is sized to fit within the raceway.

13. An apparatus comprising:
    multiple lines;
    mounting means for supporting the lines, the mounting means having multiple securing means for releasably securing the lines to the mounting means, wherein each of the multiple lines is connected to separate securing means, the mounting means further comprising recesses disposed between the multiple mounting means for providing an area around which the lines can be secured to the mounting means; and
    attachment means for releasably attaching to an end of a fish tape and attached to an end of the mounting means.

14. The apparatus of claim 13, wherein the securing means has an inner dimension sized to receive the line.

15. The apparatus of claim 13, wherein the mounting means is sized to fit within the raceway.

16. The apparatus of claim 13, wherein the attachment means is sized to fit within the raceway.

17. The apparatus of claim 13, wherein the attachment means is releasably attached to the end of the mounting means.

18. An apparatus for pulling line through a raceway, the apparatus comprising:
    an undulated body constructed of metal, and having a plurality of expanded mounting apertures along the length of the body for receiving line, and a plurality of elongated recesses providing areas for securing the line to the body, one of the elongated recesses being positioned between each two consecutive mounting apertures along the length of the body; and
    an attachment member releasably coupled to the undulated body, the attachment member comprising a loop at one end thereof releasably coupling the attachment member to the undulated body, and a hook disposed at an opposed end thereof for releasably coupling the attachment member to a fish tape.

19. The apparatus of claim 18, wherein each of the mounting apertures has rounded convex circumferential edges about the opening of the mounting aperture.

20. The apparatus of claim 18, further comprising a plurality of lines extending through respective ones of the plurality of mounting apertures, the lines being folded through the mounting apertures and secured to the recesses of the body by tape.

* * * * *